(12) United States Patent
Nagarandal et al.

(10) Patent No.: US 10,152,566 B1
(45) Date of Patent: Dec. 11, 2018

(54) CONSTRAINT BASED BIT-STREAM COMPRESSION IN HARDWARE FOR PROGRAMMABLE DEVICES

(71) Applicant: Altera Corporation, San Jose, CA (US)

(72) Inventors: Ajay Nagarandal, Fremont, CA (US); Bo Zhou, Milpitas, CA (US)

(73) Assignee: Altera Corporation, San Jose, CA (US)

( * ) Notice: Subject to any disclaimer, the term of this patent is extended or adjusted under 35 U.S.C. 154(b) by 88 days.

(21) Appl. No.: 15/277,365

(22) Filed: Sep. 27, 2016

(51) Int. Cl.
*G06F 17/50* (2006.01)
*H03K 19/177* (2006.01)
*G06F 15/78* (2006.01)

(52) U.S. Cl.
CPC ...... *G06F 17/5054* (2013.01); *G06F 15/7867* (2013.01); *G06F 17/5045* (2013.01); *G06F 17/5068* (2013.01); *G06F 17/5072* (2013.01); *G06F 2217/06* (2013.01); *H03K 19/17736* (2013.01)

(58) Field of Classification Search
CPC ............ G06F 17/5054; G06F 2217/06; G06F 17/5045; G06F 17/5072; G06F 15/7867; G06F 17/5068
See application file for complete search history.

(56) References Cited

U.S. PATENT DOCUMENTS

| | | | |
|---|---|---|---|
| 5,600,263 A | 2/1997 | Trimberger et al. | |
| 5,745,734 A | 4/1998 | Craft et al. | |
| 5,930,148 A * | 7/1999 | Bjorksten | G06F 17/505 716/104 |
| 6,327,634 B1 | 12/2001 | Statovici et al. | |
| 6,526,557 B1 | 2/2003 | Young et al. | |
| 6,754,763 B2 * | 6/2004 | Lin | G06F 15/7864 361/748 |
| 7,024,654 B2 * | 4/2006 | Bersch | G06F 17/5054 716/117 |
| 7,299,155 B2 * | 11/2007 | Ebert | 702/182 |
| 7,307,977 B1 * | 12/2007 | Eran | H04B 1/7117 370/342 |
| 7,362,135 B1 * | 4/2008 | Chang | G06F 17/5054 326/41 |

(Continued)

*Primary Examiner* — Helen Rossoshek
(74) *Attorney, Agent, or Firm* — Jason Tsai

(57) ABSTRACT

A programmable logic device such as an integrated circuit may receive user-defined configuration data from a circuit design system. The user-defined configuration data may include a minimal number of user-defined configuration variables necessary to configure the programmable logic device when combined with hardware-defined configuration variables generated in resolution engines in the programmable logic device based on the user-defined configuration variables. The resolution engines may process multiple hardware-defined configuration variables simultaneously and in parallel. A temporary storage device in the programmable logic device may store the user-defined configuration variables, the hardware-defined configuration variables, and preloaded configuration data. The resolution engines may generate a configuration bitstream to configure a configuration random access memory on the device using the configuration data stored on the temporary storage.

18 Claims, 11 Drawing Sheets

(56) References Cited

U.S. PATENT DOCUMENTS

| | | | |
|---|---|---|---|
| 7,406,673 B1* | 7/2008 | Patterson | G06F 17/5054 713/100 |
| 7,602,792 B2 | 10/2009 | Gray et al. | |
| 8,244,512 B1* | 8/2012 | Tseng | G06F 17/5022 703/13 |
| 8,664,975 B1* | 3/2014 | Gao | H03K 19/17752 326/38 |
| 8,756,540 B1* | 6/2014 | Baeckler | G06F 17/505 716/101 |
| 2007/0005320 A1* | 1/2007 | Vinberg | G06F 17/50 703/13 |
| 2008/0242347 A1* | 10/2008 | Zetterman | G06F 15/7867 455/552.1 |
| 2009/0007050 A1* | 1/2009 | Martin | G06F 17/5054 716/128 |
| 2010/0223237 A1 | 9/2010 | Mishra et al. | |
| 2011/0029984 A1* | 2/2011 | Norman | G05B 19/41865 718/106 |
| 2011/0307233 A1* | 12/2011 | Tseng | G06F 17/5022 703/14 |
| 2012/0030646 A1* | 2/2012 | Ravindran | G06F 8/34 717/105 |
| 2012/0216019 A1* | 8/2012 | Bower | G06F 17/5054 712/201 |
| 2013/0305199 A1* | 11/2013 | He | G06F 17/5054 716/104 |
| 2014/0021981 A1* | 1/2014 | Hutton | G06F 17/5054 326/41 |
| 2014/0040855 A1* | 2/2014 | Wang | G06F 9/4436 717/107 |
| 2015/0370941 A1* | 12/2015 | Yi | G06F 17/5054 716/104 |
| 2016/0291988 A1* | 10/2016 | Zimmermann | G06F 9/4411 |
| 2016/0344645 A1* | 11/2016 | Zhang | H04L 45/28 |
| 2017/0139629 A1* | 5/2017 | Van Lunteren | G06F 3/0629 |
| 2017/0272077 A1* | 9/2017 | Sharma | H03K 19/1737 |
| 2018/0088174 A1* | 3/2018 | Davis | G01R 31/31705 |

* cited by examiner

CONSTRAINT BASED BIT-STREAM COMPRESSION IN HARDWARE FOR PROGRAMMABLE DEVICES

BACKGROUND

This relates to integrated circuits and more particularly, to systems for performing constraint based bitstream compression using hardware in integrated circuit devices such as programmable integrated circuits.

Programmable integrated circuits (e.g., field programmable gate arrays) are a type of integrated circuit that can be programmed by a user to implement a desired custom logic function. In a typical scenario, a logic designer uses computer-aided design tools to design a custom logic circuit that performs custom logic functions. When the design process is complete, the computer-aided design tools generate configuration data. The configuration data is loaded into memory elements to configure the devices to perform the functions of the custom logic circuit. Memory elements are often formed using random-access-memory (RAM) cells. Because the RAM cells are loaded with configuration data during device programming, the RAM cells are sometimes referred to as configuration memory or configuration random-access-memory cells (CRAM).

When a programmable integrated circuit is powered up, the content of these RAM cells is replaced with data (e.g., configuration data) from non-volatile devices (e.g., flash memory or micro-processor devices). This process is called bit-stream loading. The programmable interconnect circuit is traditionally required to remain idle during configuration bit-stream loading operations. In order to minimize idle time of the programmable integrated circuit, it would be desirable to improve the loading time of the configuration bitstream onto the programmable integrated circuit.

SUMMARY

Circuitry on a programmable logic device may include a scheduling circuit that receives user-defined configuration data, a temporary storage that is coupled to the scheduling circuit and that receives and stores the user-defined configuration data from the scheduling circuit, and resolution engines coupled to the scheduling circuit that receive the user-defined configuration data from the scheduling circuit and that generate hardware-defined configuration data based on the user-defined configuration data and a set of predefined constraints. The resolution engines may generate a configuration bitstream using the user-defined configuration data and the hardware-defined configuration data. The user-defined configuration data may correspond to a user-selected mode of operation for the programmable logic circuitry.

The programmable logic device may also include configuration random access memory (CRAM) coupled to the resolution engines. The configuration random access memory may be configured using the configuration bitstream. The scheduling circuit may be coupled to the temporary storage and to the resolution engines through a bus. The resolution engines may be coupled to the temporary storage through the bus. The scheduling circuit may receive the configuration data from an external circuit design system.

The temporary storage may receive the hardware-defined configuration data from the resolution engines through the bus. The temporary storage may be coupled between the configuration random access memory and the bus in parallel, and may process subsets of the user-defined configuration data simultaneously and in parallel based on the set of pre-defined constraints to generate the hardware-defined configuration data. The temporary storage may store preloaded configuration data. The configuration bitstream may include the preloaded configuration data.

A first resolution engine may generate a first set of hardware-defined configuration variables from a first set of user-defined configuration variables based on a first dependency tree. A second resolution engine may generate a second set of hardware-defined configuration variables from a second set of user-defined configuration variables based on a second dependency tree.

One of the resolution engines may include registers, arithmetic circuitry that performs arithmetic operations on outputs of a first subset of the registers, a comparator that performs comparator operations on outputs of a second subset of the registers, logic circuitry that performs logic operations on outputs of the comparator and a third subset of the registers, and a write controller that writes a value stored in one of the registers to a result storage. The write controller may assert a results done flag when the value is written to the result storage.

In accordance with any of the above arrangements, non-transitory computer-readable storage media may include instructions for performing the operations described herein.

DETAILED DESCRIPTION

Embodiments of the present invention relate to integrated circuits and, more particularly, to ways for improving configuration bit-stream compression for programmable integrated circuits.

It will be obvious to one skilled in the art, that the present exemplary embodiments may be practiced without some or all of these specific details. In other instances, well-known operations have not been described in detail in order not to unnecessarily obscure the present embodiments.

Figure 1:
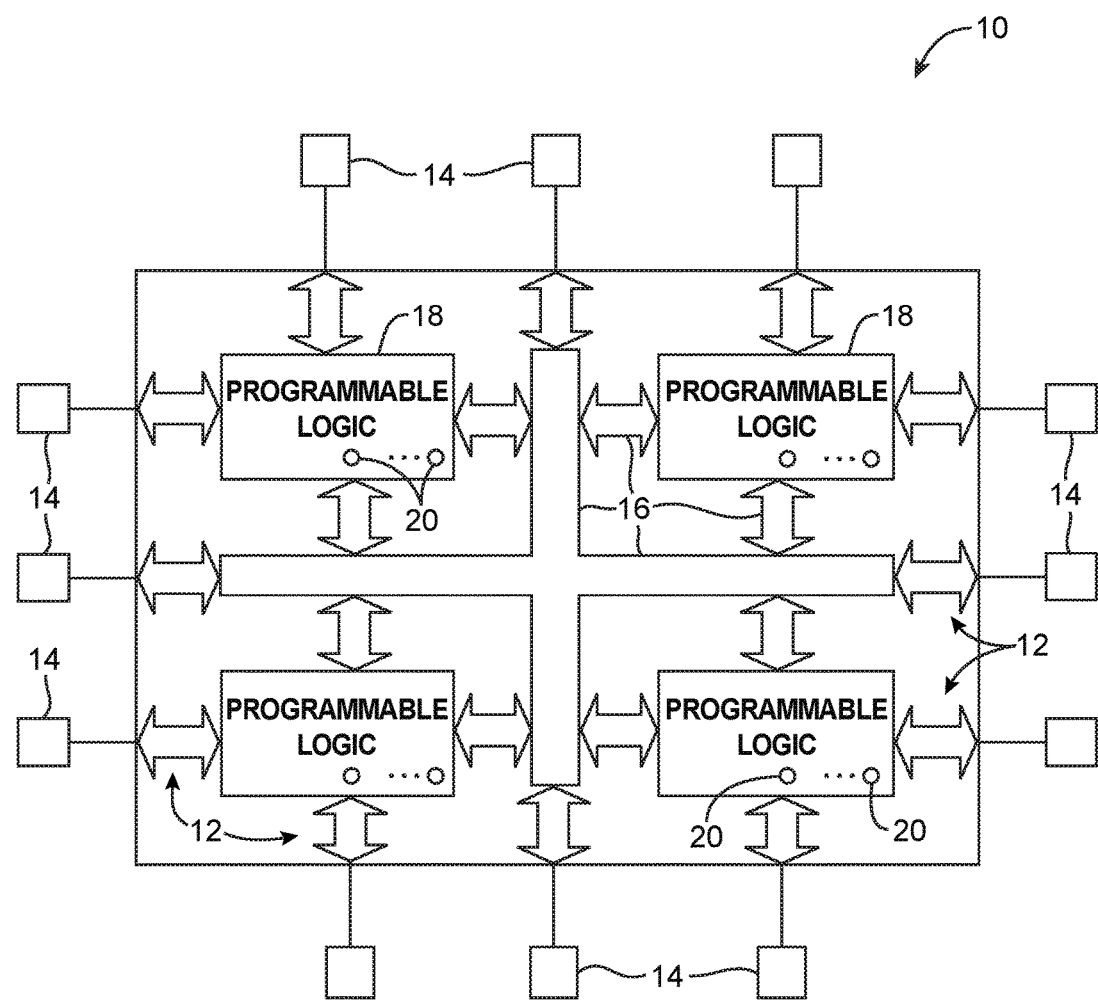
FIG. 1 is a diagram of an illustrative programmable integrated circuit with programmable logic in accordance with an embodiment.

FIG. 1 shows a diagram of an illustrative programmable integrated circuit device. As shown in FIG. 1, device 10 may have input-output (I/O) circuitry 12 for driving signals off of device 10 and for receiving signals from other devices via input-output pins 14. Interconnection resources 16 such as global and local vertical and horizontal conductive lines and buses may be used to route signals on device 10. Interconnection resources 16 include fixed interconnects (conductive lines) and programmable interconnects (i.e., programmable connections between respective fixed interconnects). Interconnection resources 16 may sometimes be referred to herein as interconnects (e.g., interconnects formed from combinations of fixed interconnects and programmable interconnects).

Interconnects 16 may be used to interconnect regions of programmable logic such as programmable logic regions 18. Programmable logic regions 18 may sometimes be referred to as logic array blocks or programmable circuit regions. Programmable logic regions 18, may, if desired, contain groups of smaller logic regions. These smaller logic regions, which may sometimes be referred to as logic elements or adaptive logic modules, may be interconnected using local interconnection resources.

Programmable logic regions 18 may include combinational and sequential logic circuitry. For example, programmable logic regions 18 may include look-up tables, registers, and multiplexers. Programmable logic regions 18 may be configured to perform one or more custom logic functions.

Programmable logic regions 18 contain programmable elements 20. Programmable elements 20 may be based on any suitable programmable technology, such as fuses, antifuses, electrically-programmable read-only-memory technology, random-access memory cells, mask-programmed elements, etc. As an example, programmable elements 20 may be formed from memory cells. During programming, configuration data is loaded into the memory cells using pins 14 and input-output circuitry 12. The memory cells are typically random-access-memory (RAM) cells. Because the RAM cells are loaded with configuration data, they are sometimes referred to as configuration RAM cells (CRAM).

Programmable elements 20 may be used to provide static control output signals for controlling the state of logic components in programmable logic 18. The output signals generated by elements 20 are typically applied to gates of metal-oxide-semiconductor (MOS) transistors (sometimes referred to as pass gate transistors).

The circuitry of device 10 may be organized using any suitable architecture. As an example, logic 18 of programmable device 10 may be organized in a series of rows and columns of larger programmable logic regions, each of which contains multiple smaller logic regions. The logic resources of device 10 may be interconnected by interconnection resources 16 such as associated vertical and horizontal conductors. These conductors may include global conductive lines that span substantially all of device 10, fractional lines such as half-lines or quarter lines that span part of device 10, staggered lines of a particular length (e.g., sufficient to interconnect several logic areas), smaller local lines, or any other suitable interconnection resource arrangement. If desired, the logic of device 10 may be arranged in more levels or layers in which multiple large regions are interconnected to form still larger portions of logic. Other device arrangements may use logic that is not arranged in rows and columns.

Figure 2:
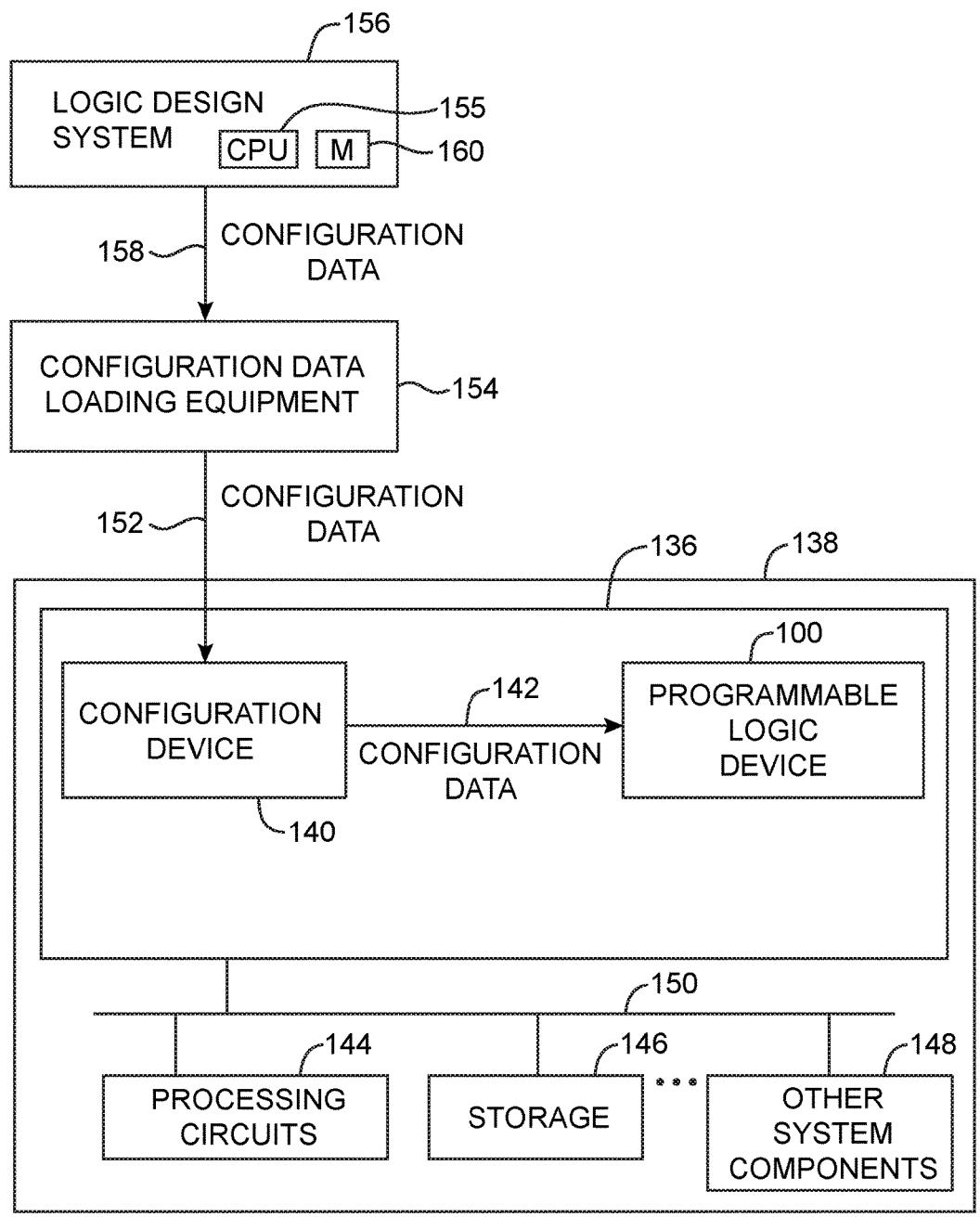
FIG. 2 is an illustrative diagram showing how configuration data may be generated by a logic design system and loaded into a programmable device in accordance with an embodiment.

The various structures and components that are included in an integrated circuit can be designed using a circuit design system. An illustrative system environment for device 100 is shown in FIG. 2. Device 100 may, for example, be mounted on a board 136 in a system 138. In general, programmable logic device 100 may receive configuration data from programming equipment or from other suitable equipment or device. In the example of FIG. 2, programmable logic device 100 is the type of programmable logic device that receives configuration data from an associated integrated circuit 140. With this type of arrangement, circuit 140 may, if desired, be mounted on the same board 136 as programmable logic device 100. Circuit 140 may be an erasable-programmable read-only memory (EPROM) chip, a programmable logic device configuration data loading chip with built-in memory (sometimes referred to as a configuration device), or other suitable device. When system 138 boots up (or at another suitable time), the configuration data for configuring the programmable logic device may be supplied to the programmable logic device from device 140, as shown schematically by path 142. The configuration data that is supplied to the programmable logic device may be stored in the programmable logic device in its configuration random-access-memory elements.

System 138 may include processing circuits 144, storage 146, and other system components 148 that communicate with device 100. The components of system 138 may be located on one or more boards such as board 136 or other suitable mounting structures or housings and may be interconnected by buses and other electrical paths 150. If desired, programmable device 100 may be loaded with configuration data without mounting device 100 and/or configuration device 140 to board 136 (e.g., using any desired configuration data loading equipment).

Configuration device 140 may be supplied with the configuration data for device 100 (sometimes referred to herein as target circuit or target device 100) over a path such as path 152. Configuration device 140 may, for example, receive the configuration data from configuration data loading equipment 154 or other suitable equipment that stores this data in configuration device 140. Device 140 may be loaded with data before or after installation on board 136.

It can be a significant undertaking to design and implement a desired (custom) logic circuit in a programmable logic device. Logic designers therefore generally use logic design systems based on computer-aided-design (CAD) tools to assist them in designing circuits. A logic design system can help a logic designer design and test complex circuits for a system. When a design is complete, the logic design system may be used to generate configuration data for electrically programming the appropriate programmable logic device.

As shown in FIG. 2, the configuration data produced by a logic design system 156 (sometimes referred to herein as logic design equipment 156, logic design computer 156, logic design processor 156, logic design computing equipment 156, logic design circuitry 156, or data stream generation circuitry 156) may be provided to equipment 154 over a path such as path 158. Equipment 154 provides the configuration data to device 140, so that device 140 can later provide this configuration data to the programmable logic device 100 over path 142. System 156 may be based on one or more computers and one or more software programs. In general, software and data may be stored on any computer-readable medium (storage) in system 156 and is shown schematically as storage 160 in FIG. 2. System 156 may include processing circuitry in the form of one or more processors such as central processing unit (CPU) 155. In general, any desired processing circuitry may be formed on system 156.

In a typical scenario, logic design system 156 is used by a logic designer to create a custom circuit (logic) design. For example, the logic designer may provide input commands to logic design system 156 (e.g., by selecting on screen commands displayed on a display screen, by entering commands using a user input device such as a mouse and/or keyboard, etc.). The system 156 produces corresponding configuration data which is provided to configuration device 140. Upon power-up, configuration device 140 and data loading circuitry on programmable logic device 100 are used to load the configuration data into CRAM cells on device 100. Device 100 may then be used in normal operation of system 138. The example of FIG. 2 is merely illustrative. In general, any desired system may be used to load configuration data generated by logic design system 156 onto programmable logic device 100.

Figure 3:
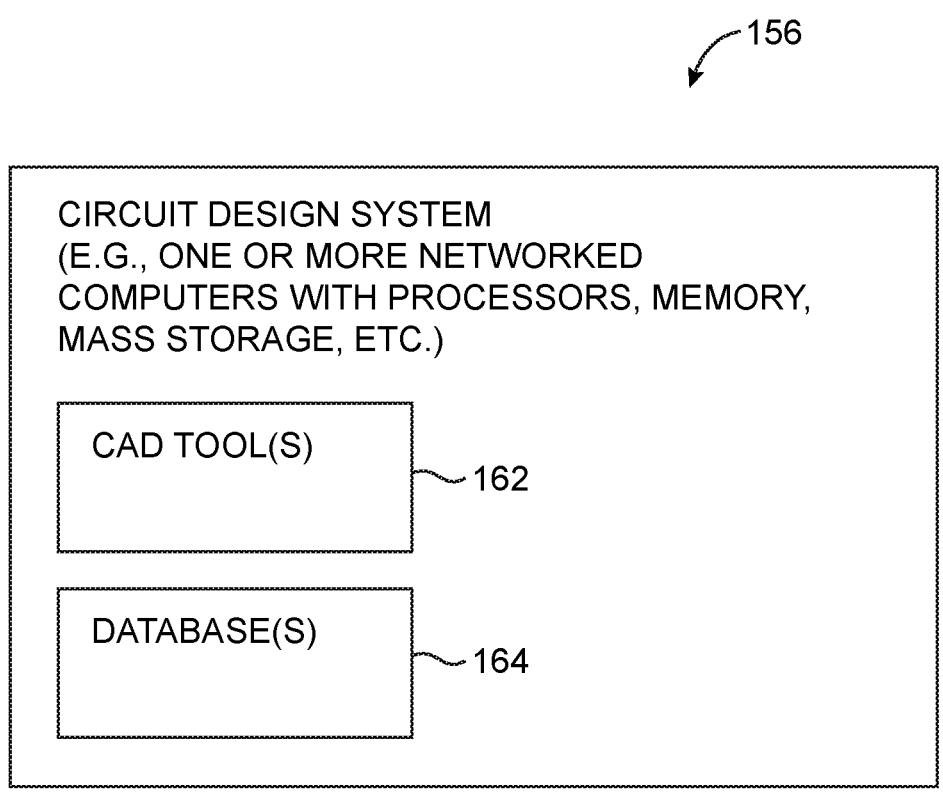
FIG. 3 is a diagram of a circuit design system that may be used to design integrated circuits in accordance with an embodiment.

An illustrative circuit (logic) design system 156 in accordance with the present invention is shown in FIG. 3. System 156 may be based on one or more processors such as personal computers, workstations, etc. The processor(s) may be linked using a network (e.g., a local or wide area network). Memory in these computers or external memory and storage devices such as internal and/or external hard disks may be used to store instructions and data.

Software-based components such as computer-aided design tools 162 and databases 164 reside on system 156. During operation, executable software such as the software of computer aided design tools 162 runs on the processor(s) of system 156. Databases 164 are used to store data for the operation of system 156. In general, software and data may be stored on any computer-readable medium (storage) in system 156. Such storage may include computer memory chips, removable and fixed media such as hard disk drives, flash memory, compact discs (CDs), digital versatile discs (DVDs), blu-ray discs (BDs), other optical media, and floppy diskettes, tapes, or any other suitable memory or storage device(s). When the software of system 156 is installed, the storage of system 156 has instructions and data that cause the computing equipment in system 156 to execute various methods (processes). When performing these processes, the computing equipment is configured to implement the functions of the circuit design system.

The computer aided design (CAD) tools 162, some or all of which are sometimes referred to collectively as a CAD tool or an electronic design automation (EDA) tool, may be provided by a single vendor or by multiple vendors. Tools 162 may be provided as one or more suites of tools (e.g., a compiler suite for performing tasks associated with implementing a circuit design in a programmable logic device) and/or as one or more separate software components (tools). Database(s) 164 may include one or more databases that are accessed only by a particular tool or tools and may include one or more shared databases. Shared databases may be accessed by multiple tools. For example, a first tool may store data for a second tool in a shared database. The second tool may access the shared database to retrieve the data stored by the first tool. This allows one tool to pass information to another tool. Tools may also pass information between each other without storing information in a shared database if desired.

Figure 4:
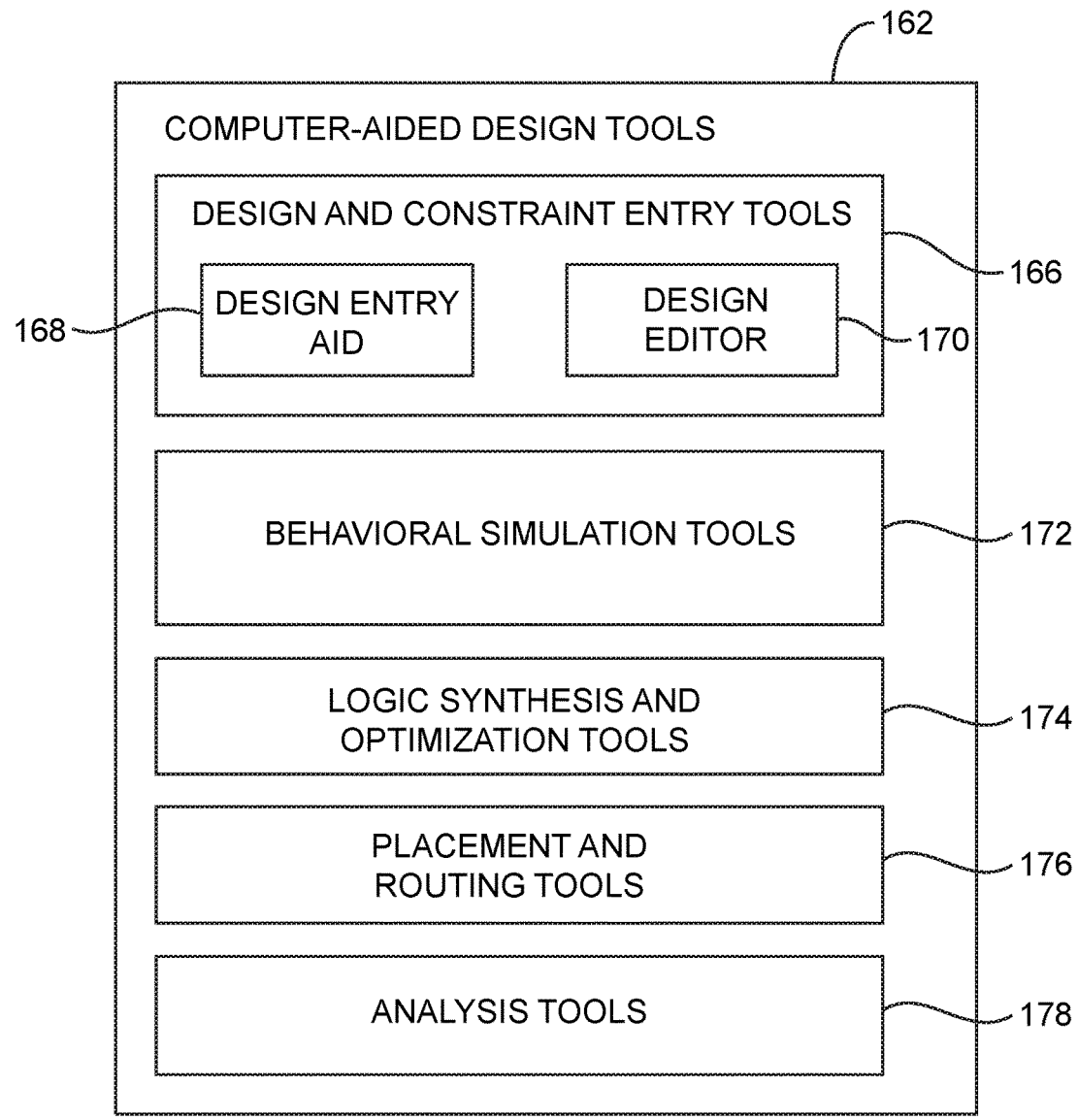
FIG. 4 is a diagram of illustrative computer-aided design (CAD) tools that may be used in a circuit design system in accordance with an embodiment.

Illustrative computer aided design tools 162 that may be used in a circuit design system such as circuit design system 156 of FIG. 3 are shown in FIG. 4.

The design process may start with the formulation of functional specifications of the integrated circuit design (e.g., a functional or behavioral description of the integrated circuit design). A circuit designer may specify the functional operation of a desired circuit design using design and constraint entry tools 166. Design and constraint entry tools 166 may include tools such as design and constraint entry aid 168 and design editor 170. Design and constraint entry aids such as aid 168 may be used to help a circuit designer locate a desired design from a library of existing circuit designs and may provide computer-aided assistance to the circuit designer for entering (specifying) the desired circuit design.

As an example, design and constraint entry aid 168 may be used to present screens of options for a user. The user may click on on-screen options to select whether the circuit being designed should have certain features. Design editor 170 may be used to enter a design (e.g., by entering lines of hardware description language code), may be used to edit a design obtained from a library (e.g., using a design and constraint entry aid), or may assist a user in selecting and editing appropriate prepackaged code/designs.

Design and constraint entry tools 166 may be used to allow a circuit designer to provide a desired circuit design using any suitable format. For example, design and constraint entry tools 166 may include tools that allow the circuit designer to enter a circuit design using truth tables. Truth tables may be specified using text files or timing diagrams and may be imported from a library. Truth table circuit design and constraint entry may be used for a portion of a large circuit or for an entire circuit.

As another example, design and constraint entry tools 166 may include a schematic capture tool. A schematic capture tool may allow the circuit designer to visually construct integrated circuit designs from constituent parts such as logic gates and groups of logic gates. Libraries of preexisting integrated circuit designs may be used to allow a desired portion of a design to be imported with the schematic capture tools.

If desired, design and constraint entry tools 166 may allow the circuit designer to provide a circuit design to the circuit design system 156 using a hardware description language such as Verilog hardware description language (Verilog HDL), Very High Speed Integrated Circuit Hardware Description Language (VHDL), SystemVerilog, or a higher-level circuit description language such as OpenCL or SystemC, just to name a few. The designer of the integrated circuit design can enter the circuit design by writing hardware description language code with editor 170. Blocks of code may be imported from user-maintained or commercial libraries if desired.

After the design has been entered using design and constraint entry tools 166, behavioral simulation tools 172 may be used to simulate the functional performance of the circuit design. If the functional performance of the design is incomplete or incorrect, the circuit designer can make changes to the circuit design using design and constraint entry tools 166. The functional operation of the new circuit design may be verified using behavioral simulation tools 172 before synthesis operations have been performed using tools 176. Simulation tools such as behavioral simulation tools 172 may also be used at other stages in the design flow if desired (e.g., during logic synthesis). The output of the behavioral simulation tools 172 may be provided to the circuit designer in any suitable format (e.g., truth tables, timing diagrams, etc.).

Once the functional operation of the circuit design has been determined to be satisfactory, logic synthesis and optimization tools 174 may generate a gate-level netlist of the circuit design, for example using gates from a particular library pertaining to a targeted process supported by a foundry, which has been selected to produce the integrated circuit. Alternatively, logic synthesis and optimization tools 174 may generate a gate-level netlist of the circuit design using gates of a targeted programmable logic device such as device 100 (i.e., in the logic and interconnect resources of a particular programmable logic device product or product family).

Logic synthesis and optimization tools 174 may optimize the design by making appropriate selections of hardware to implement different logic functions in the circuit design based on the circuit design data and constraint data entered by the logic designer using tools 166. Tools 174 may optimize the design while ensuring that device constraints are satisfied. Such device constrains may include legality rules (sometimes referred to herein as legality constraints) and timing constraints. The legality rules may specify what placement of logic elements within the design and what interconnections are legal or illegal (e.g., which placements and interconnections satisfy or do not satisfy the legality rules). Examples of legality constraints that may be imposed include rules about where certain logic elements can be placed, rules dictating that multiple elements cannot share a single location on the design, clustering rules, rules dictating how elements can be connected, clocking rules (e.g., constraints on how each logic element in the design is clocked or how many clocks each logic cluster may receive), packing rules, or other desired legality constraints.

The timing constraints may provide constraints on timing within the design. The timing constraints may, for example, include rules limiting the maximum allowable signal propagation delay between each element in the logic design or on a combinational path connecting the logic elements. The legality rules and timing constraints may be provided by a logic designer operating system 162, by a manufacturer of integrated circuit 100 or system 138, by regulatory standards, etc. Tools 174 may perform optimizations to the logic design while ensuring that any optimizations maintain or satisfy both the legality constraints and the timing constraints.

After logic synthesis and optimization using tools 174, the circuit design system may use tools such as placement and routing tools 176 to perform physical design steps (layout and routing operations). Placement and routing tools 176 are used to determine where to place each gate of the gate-level netlist produced by tools 174. For example, if two counters interact with each other, the placement and routing tools 176 may locate these counters in adjacent regions to reduce interconnect delays or to satisfy timing requirements specifying the maximum permitted interconnect delay. The placement and routing tools 176 create orderly and efficient implementations of circuit designs for any targeted integrated circuit (e.g., for a given programmable integrated circuit such as a field-programmable gate array (FPGA)).

Tools such as tools 174 and 176 may be part of a compiler suite (e.g., part of a suite of compiler tools provided by a programmable logic device vendor). In accordance with the present invention, tools such as tools 174, 176, and 178 may also include timing analysis tools such as timing estimators. This allows tools 174 and 176 to satisfy performance requirements (e.g., timing requirements) before actually producing the integrated circuit. As an example, tools 174 and 176 may partition data paths into subsets of data paths and instantiate additional cascaded processing and storage circuitry for each newly created subset of data paths. If desired, tools 174 and 176 may register pipeline selected paths in order to provide for higher clock rates in exchange for increased latency.

After a layout implementation of the desired circuit design has been generated using placement and routing tools 176, the implementation of the design may be analyzed and tested using analysis tools 178. After satisfactory optimization operations have been completed using tools 162 and depending on the targeted integrated circuit technology, tools 120 may produce a mask-level layout description of the integrated circuit or configuration data for programming the programmable logic device.

Figure 5:
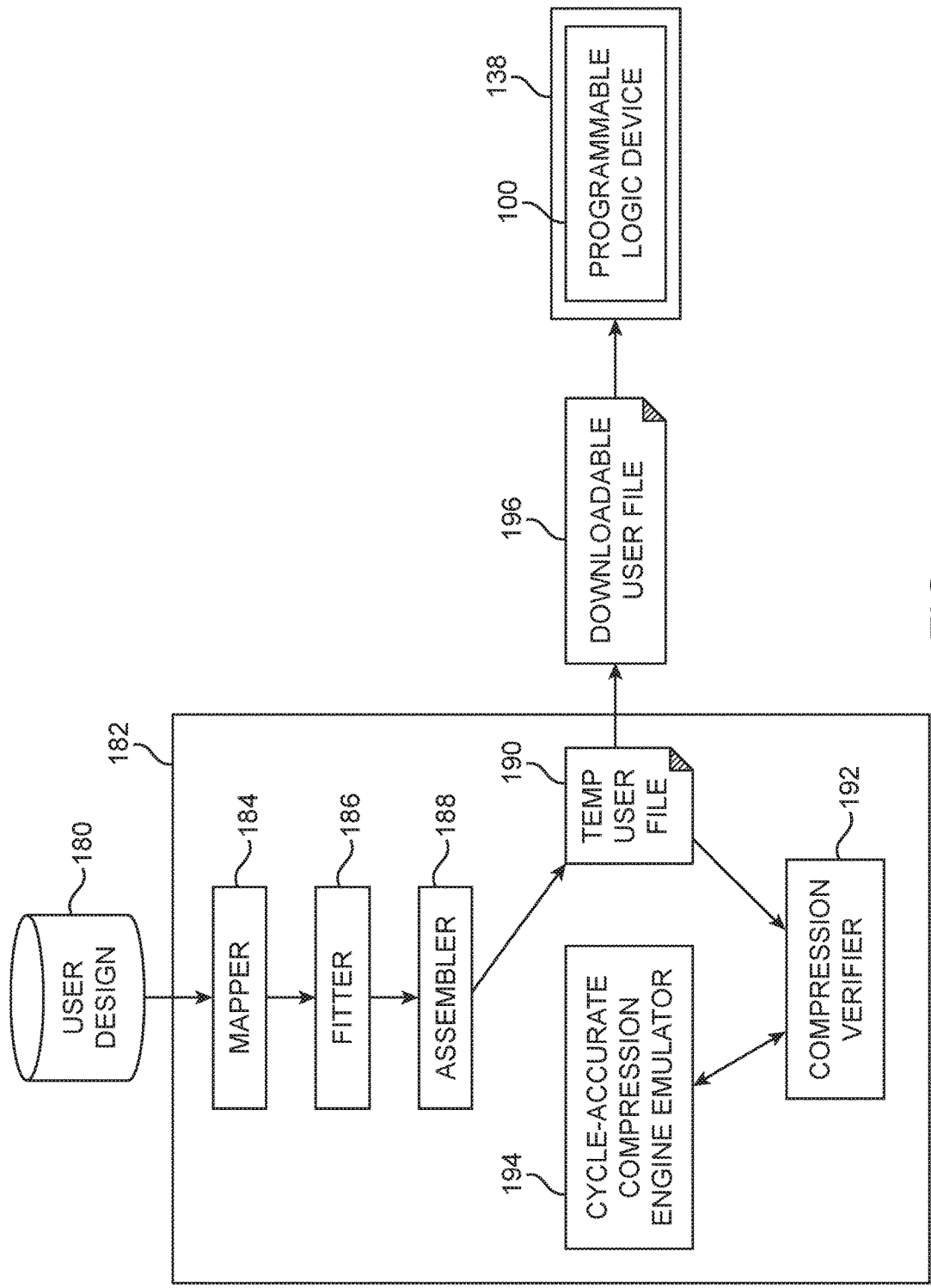
FIG. 5 is a diagram showing the illustrative process flow undergone by a user circuit design before it is loaded onto a programmable logic device within a system in accordance with an embodiment.
Figure 6:
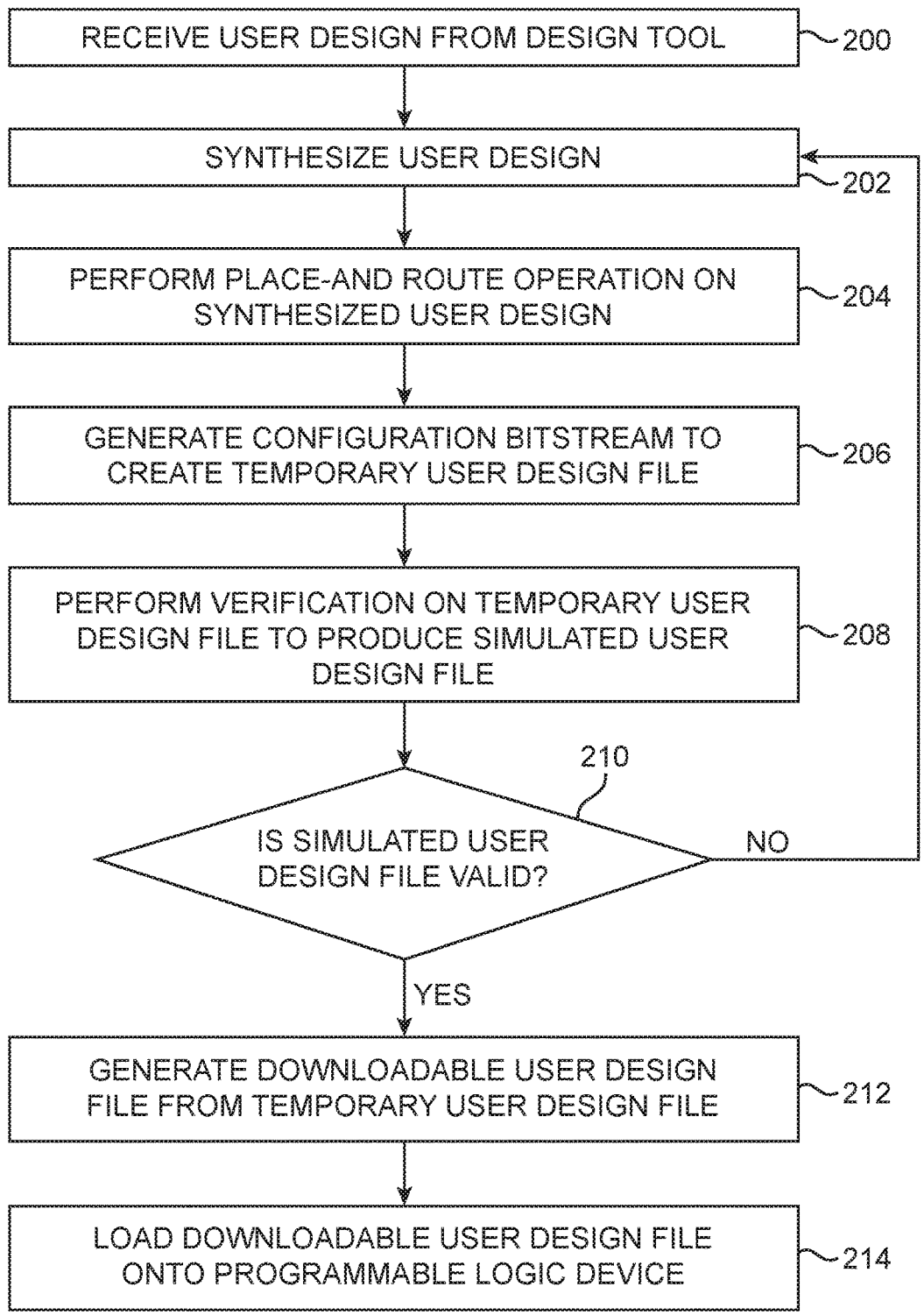
FIG. 6 is a flow chart of illustrative steps that may be performed by a circuit design system in processing the operations shown in FIG. 5 in accordance with an embodiment.

FIG. 5 is a diagram showing how system 156 may process a user circuit design 180 for loading the design onto configuration memory of programmable device 100. Operations that may be performed by equipment 156 in processing user design 180 for loading onto device 100 are shown in FIG. 6. User circuit design 180 may be based on a circuit design defined by a user (logic designer) and may, for example, contain configuration data (e.g., in the form of user-defined configuration variables) that defines a particular mode of operation for device 100 (e.g., for configuration random access memory in device 100). When this configuration data is loaded onto device 100, device 100 may implement the user-defined circuit design that user circuit design 180 is based on.

In order to improve configuration time of programmable logic device 100 and minimize the amount of down-time experienced by programmable logic device 100, it may be desirable to compress or reduce the amount or size of the configuration data that is transmitted to device 100 for implementing custom user logic. In some scenarios, a compression operation may be performed on a user circuit design (e.g., Shannon Fano compression algorithms, Huffman compression algorithms, Lempel-Ziv compression algorithms, etc.) to compress the size of the configuration data transmitted to device 100. Traditionally, before a compressed user design is loaded onto a programmable logic device, the compressed user design must be synthesized, placed, routed, and assembled into a configuration bitstream. During the transmission of the configuration bitstream and the configuration of the end-device 100, the operation of the end-device may be undesirably interrupted.

When performing these operations on the compressed user design, the process may introduce unwanted errors in the user design, which can result in undesirable configuration failure when the configuration bitstream is loaded onto the programmable logic device. Thus, it would be desirable to provide a means of compression verification that may be performed on the configuration bitstream before it is loaded onto the programmable logic device in order to detect any errors that may result in configuration failure. Additionally, it would be advantageous to minimize the amount of data transferred from the circuit design system to the end-device in order to minimize the amount of down-time experienced by the end-device.

User design 180 may be a condensed or compressed user design that specifies the mode of operation of various logic circuitry, logic blocks or Intellectual Property (IP) blocks (e.g., programmable elements 20 of FIG. 1) within programmable logic device 100 in system 138. For example, rather than including all of the configuration bits needed to configure programmable logic device 100, user design 180 may, for example, only include a minimal amount of configuration data that specifies a desired mode of operation for one or more logic blocks.

Specifically, user design 180 may include configuration data that contains user-defined configuration variables that may be processed by hardware on programmable logic device 100 based on pre-defined hardware constraints in order to generate hardware-defined configuration data. A final configuration bitstream that includes both user-defined configuration data and hardware-defined configuration data may then be used to configure the programmable logic on device 100. This type of arrangement may serve to effectively compress the user design and may advantageously require the transmission of less data from system 156 to programmable logic device 100 when loading programmable logic device 100 with user design 180 compared to the amount of data that would need to be transmitted using traditional compression algorithms (e.g., Shannon Fano algorithms, Huffman algorithms, etc.). Transmission between system 156 and programmable logic device 100 may be slower than on-chip data transmission performed between elements within programmable logic device 100. Because less data needs to be transmitted from system 156 to programmable logic device 100, the down-time experienced by programmable logic device 100 during configuration may be reduced.

Once programmable logic device 100 is loaded with downloadable user file 196 (i.e., with user-defined configuration data), hardware (circuitry) on programmable logic device 100 may generate additional configuration data (e.g., hardware-defined configuration data) based on predefined hardware constraints. Circuitry within programmable logic device 100 may then generate a complete configuration data bitstream that includes both the user-defined configuration data and the hardware-defined (generated) configuration data. The complete configuration data bitstream may then be used to configure configuration memory (e.g., configuration random access memory (CRAM)) in programmable logic device 100.

In order to verify that the complete configuration data bitstream generated on device 100 will properly configure the CRAM on device 100, compression verification may be performed on user design 180. The compression verification may involve emulating the hardware and associated hardware constraints of programmable logic device 100 in order to generate simulated hardware-defined configuration data and a simulated final (complete) configuration data bitstream. This simulated final bitstream may then be verified to ensure that the simulated final bitstream would not result in configuration failure when loaded into configuration random access memory on device 100.

Computer-aided design tools 162 of FIG. 4 may include processing engine (circuitry) 182, as shown in FIG. 5. Engine 182 may include mapper engine 184, fitter engine 186, assembler engine 188, compression emulation engine 194, and compression verification engine 192. Processing engine 182 may assemble user design 180 to generate temporary user file 190 based on user design 180. Engine 182 may subsequently perform a compression verification operation on temporary file 190.

At step 200 of FIG. 6, mapper 184 on processing engine 182 may receive user logic design 180. User logic design 180 may, for example, include user-defined configuration data for configuring programmable logic device 100. In other words, user logic design 180 may include the minimum amount of data required to retrieve the required hardware-defined configuration data and to generate the complete configuration data bitstream at device 100 to implement the desired user logic design. If desired, user logic design 180 may be a netlist.

At step 202, mapper 184 may perform synthesis operations on user design 180 to generate a synthesized user design (e.g., a synthesized netlist for the user logic design).

At step 204, fitter 186 may receive the synthesized user design from mapper 184 and may perform place-and-route operations on the synthesized user design.

At step 206, assembler 188 may generate programming files such as a user-defined configuration data bitstream based on the synthesized, placed, and routed user design. The user-defined configuration data bitstream may include user-defined configuration data and may be initially generated in the form of temporary user file 190.

It is possible for errors to occur during the synthesis, placement, and routing of user design 180 in creating temporary user file 190. Such errors could result in configuration failure when the bitstream that includes user design 180 is ultimately loaded onto programmable logic device 100. Therefore, it may be desirable to verify temporary user file 190 before it is loaded onto programmable logic device 100.

At step 208, cycle-accurate compression engine emulator 194 may simulate or emulate the loading of programmable device 100 using temporary user file 190. For example, emulator 194 may emulate the performance of device 100 in receiving, processing, and loading the configuration data bitstream identified by file 190 onto the programmable logic circuitry of device 100. Emulator 194 may further simulate the generation of hardware-defined configuration data based on the user-defined configuration data bitstream, the generation of a complete configuration bitstream containing both the hardware-defined configuration data and the user-defined configuration data, and the loading/configuration of a configuration memory (e.g., CRAM) using the generated configuration bitstream.

At step 210, compression verifier 192 may analyze the emulated performance of device 100 in loading file 190 (e.g., as performed by engine 194 at step 208) to determine whether the simulated user design is valid. Specifically, if the simulated user design is valid, then the design will not result in a configuration failure during the emulation of the design onto device 100 (e.g., via file 190). Otherwise, the user design may be determined to be invalid. This operation may sometimes be referred to herein as performing compression verification operations. If engine 192 determines that the simulated user design is valid, processing may proceed to step 212. At step 212, engine 182 may generate finalized and downloadable configuration data in the form of downloadable user design file 196. Downloadable configuration file 196 may be a version of temporary file 190 that has been determined to be valid (e.g., that has been fully verified by engine 192).

At step 214, downloadable user design file 196 may be loaded onto programmable logic device 100 on system 138. If engine 192 determines that the simulated user design is not valid, the process may return to step 202 and user design 180 may be resynthesized and assembled using engines 184, 186, and 188 (e.g., the synthesis, placement, and routing of the design may be tweaked by engine 182 until the validity of design 180 is verified). This validation ensures that the configuration bitstream that will be generated by hardware in programmable logic device 100 will be valid and will not result in configuration failure.

Logic circuitry within programmable logic device 100 may be capable of operating in various modes based on configuration data loaded on programmable logic device 100. This configuration data may include user-defined configuration variables (e.g., defined in user design 180), while other configuration variables within the configuration data may be determined by processing the user-defined configuration variables using on programmable logic device 100 itself (e.g., based on pre-defined hardware constraints stored on device 100 as described in more detail in connection with FIGS. 7-11 below). A single configuration variable may, for example, be a group (i.e., sequence) of eight bits. The particular value of a given configuration variable may be referred to as a configuration variable value and may be determined by the particular value of the bits contained within that configuration variable. For example, a configuration variable may contain the bit sequence '00100100' which may have a decimal configuration variable value of '36' and a binary configuration variable value of '100100'. This example is merely illustrative, and each configuration variable may include any desired number of bits.

User-defined configuration variables may be selected by a user to direct the logic circuitry being configured to operate in a particular mode. These user-defined configuration variables may be provided by the user to a circuit design system (e.g., circuit design system 156 of FIG. 3) to generate user design 180. The user-defined configuration variables may include the minimum amount of information required to instruct the logic circuitry to operate in the particular mode, while all other configuration information may be stored within programmable logic device 100 in a temporary storage device or generated as hardware-defined configuration variables based on the user-defined configuration variables and hardware constraints. For example, some configuration data needed to configure programmable logic device 100 may not change based on the mode of operation of programmable logic device 100 (e.g., the mode defined by the user-defined configuration variables), and this static configuration data may be stored in a temporary storage device.

Specifically, the user-defined configuration variables may only define a portion of the complete circuit design corresponding to user circuit design 180. The hardware in device 100 may be used to process the user-defined configuration variables to generate hardware-defined configuration variables that may define the remainder of the complete circuit design. The user-defined configuration variables may, for example, only define the minimum amount of configuration data needed for the hardware-defined configuration variables to be generated (e.g., based on hardware constraints that specify dependencies of particular hardware-defined configuration variables on the user-defined configuration variables). In scenarios in which static configuration data is preloaded into a temporary storage device on device 100, the complete circuit design may be fully defined by a combination of the user-defined configuration variables, the hardware-defined configuration variables, and the static configuration data.

Downloadable user design file 196 may, for example, include the user-defined configuration variables, but may not include the hardware-defined configuration variables or preloaded static configuration data needed to implement a complete user design. In this way, the size of user design file 196 may be minimized, which may effectively minimize the configuration time and resultant down-time of programmable logic device 100.

Figure 7:
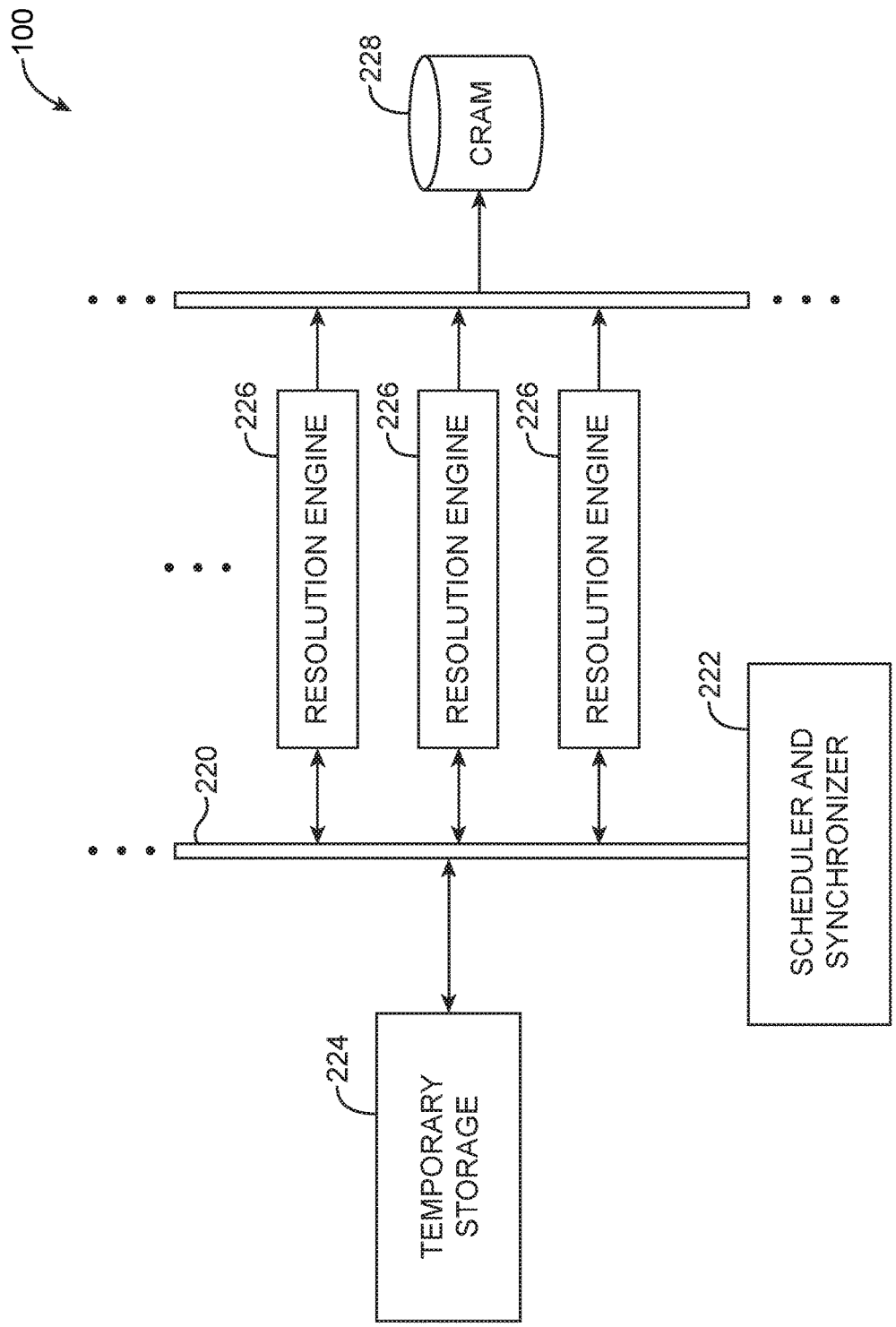
FIG. 7 is a diagram of an illustrative programmable logic device that may generate configuration variable values based on user input and hardware-defined constraints in accordance with an embodiment.

FIG. 7 shows a portion of the circuitry within programmable logic device 100 that may be used in translating user-defined configuration data into a full configuration bitstream to be loaded into configuration random access memory (CRAM). As shown in FIG. 7, device 100 may include a programmable logic circuitry such as CRAM (logic) core 228 (e.g., programmable elements 20 of FIG. 1). User-defined configuration data (e.g., data contained in downloadable user design file 196 of FIG. 5) may be loaded onto scheduler and synchronizer circuitry 222 of programmable logic device 100 via bus 220 (e.g., while processing step 214 of FIG. 6). Scheduler and synchronizer 222 may process the received user-defined configuration data to convert the user-defined configuration data into a format that can be received, processed, and stored by temporary storage 224 and resolution engines 226. For example, scheduler and synchronizer 222 may convert the received user-defined configuration data into read/write and processing operations. Scheduler and synchronizer 222 may read from and write to temporary storage 224 and may issue computation, comparator, and lookup operations to resolution engines 226. Resolution engines 226 may be controlled to generate hardware-defined configuration data that is required to implement the user design, but that is not present in user design file 196. This hardware-defined configuration data may be generated based on the user-defined configuration data and based on predefined hardware constraints implemented in the hardware of resolution engines 226.

Temporary storage 224 may be partially preloaded with (preloaded) configuration data, but may contain undefined (empty) fields. For example, some of the configuration data (i.e., static configuration data) needed to operate programmable logic device 100 will remain the same regardless of which mode programmable logic device 100 is operated in. This static configuration data may be stored in temporary storage 224 as preloaded configuration data. These undefined fields may be filled with user-defined configuration data provided to temporary storage 224 by scheduler and synchronizer 222 over bus 220. Any remaining undefined fields may be filled with hardware-defined configuration data generated by resolution engines 226.

If desired, resolution engines 226 may be arranged in parallel between bus 220 and CRAM 228 in order to perform parallel processing on user-defined configuration data provided to the resolution engines 226 from scheduler and synchronizer 222 (sometimes referred to herein as scheduling circuit 222). This parallel processing may allow multiple independent hardware-defined configuration data determination operations to be performed simultaneously.

Resolution engines 226 may be hardwired (hardcoded) into programmable logic device 100, and may be dedicated to processing user-defined configuration data to generate both hardware-defined configuration data and a final configuration bitstream to be loaded onto CRAM 228. In contrast, CRAM 228 may be implemented as programmable soft logic and may be used for a variety of user-specified functions (e.g., as configured when loaded by a full configuration data bitstream). If desired, bus 220, temporary storage 224, and/or scheduler and synchronizer 222 may also be hardwired (hardcoded) into programmable logic device 100.

In particular, each resolution engine 226 may include hard-coded hardware that defines constraints for generating hardware-defined configuration data based on user-defined configuration data (described in more detail in connection with FIGS. 10 and 11). These constraints may be particular to the design or category of programmable logic device 100 that is used, for example. Resolution engine 226 may provide the user-defined configuration data and the hardware-defined configuration data to CRAM 228 once all hardware-defined configuration data has been generated based on the user-defined configuration data.

The use of resolution engines 226 has the benefit of not requiring the recompilation of the entire reconfiguration of programmable logic device 100. In particular, only user variables that change as a result of a reconfiguration need to be updated (e.g., recompiled). After recompilation, scheduler and synchronizer 222 and resolution engines 226 may be restarted to provide updated hardware-defined configuration data to CRAM 228.

Figure 8:
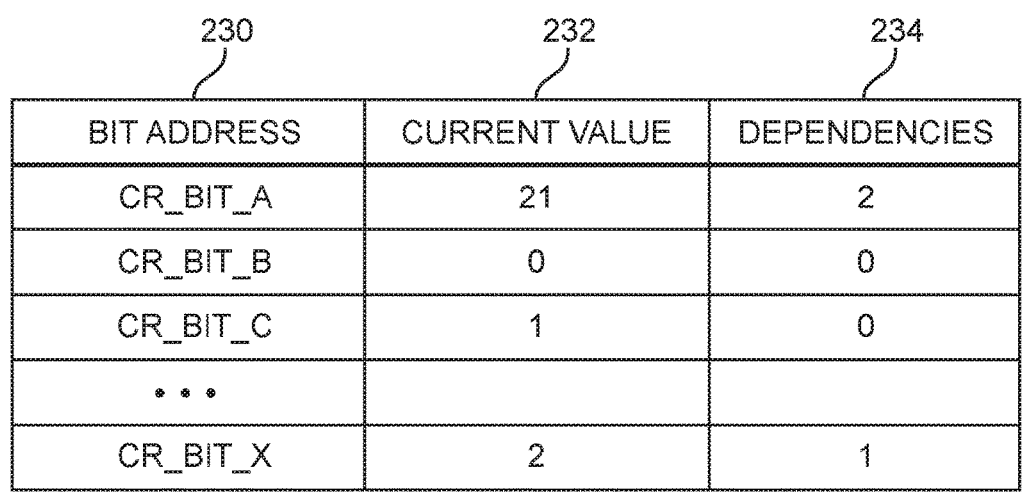
FIG. 8 is an illustrative table of metadata that may be stored on temporary storage of the type shown in FIG. 7 in accordance with an embodiment.

FIG. 8 shows an example of table of configuration data that may be stored within temporary storage 224 of FIG. 7. As shown in FIG. 8, column 230 may define bit addresses for each configuration variable, CR_BIT_A through CR_BIT_X, to be loaded into CRAM (e.g., CRAM 228 of FIG. 7). Each configuration variable may, for example, be a group of 8 sequential bits that is either defined by the user or that is generated by applying hardware-defined constraints to user-defined configuration variables (e.g., in resolution engines 226 of FIG. 7).

Column 232 may indicate the current value of each configuration variable. For example, the configuration variable beginning at address CR_BIT_A may have a value of 21, the configuration variable beginning at address CR_BIT_B may have a value of 0, the configuration variable beginning at address CR_BIT_C may have a value of 1, and the configuration variable beginning at address CR_BIT_X may have a value of 2.

Column 234 may indicate the number of other configuration variables whose values depend on the value of a particular configuration variable. For example, the values of two other configuration variables may depend on the value of the configuration variable beginning at address CR_BIT_A, the value of one other configuration variable may depend on the value of the configuration variable beginning at address CR_BIT_X, and no other configuration variables may depend on the values of either of the configuration variables beginning at addresses CR_BIT_B and CR_BIT_C, respectively. It should be noted that these configuration variable dependencies may be implemented in hardware, such as resolution engines 226 in FIG. 7. The values for one or more dependent configuration variables may be generated by processing user-defined configuration variables from which the dependent configuration variables depend in hardware.

This example is merely illustrative. If desired, predefined configuration variable values, addresses, dependency metadata, or any other desired data may be preloaded into temporary storage 224. Data stored in temporary storage 224 may be organized as a database or any other desired storage format.

Figure 9:
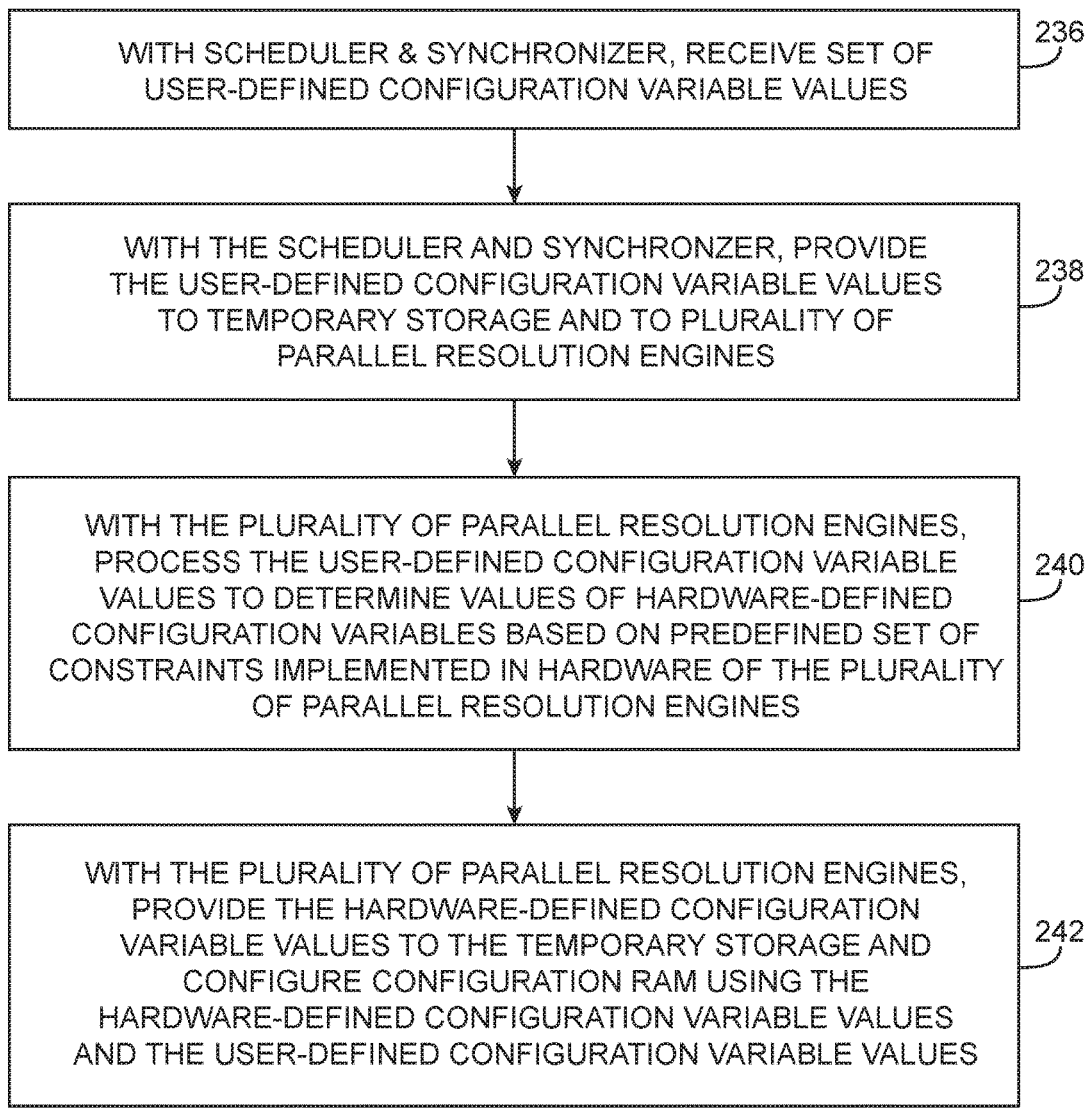
FIG. 9 is a flow chart of illustrative steps that may be performed by a programmable logic device to configure programmable logic circuitry based on user-defined configuration variable values and hardware-defined configuration variables in accordance with an embodiment.

The process of converting user-defined configuration data into a full configuration bitstream to be loaded into CRAM 228 (e.g., using the circuitry shown in FIG. 7) is illustrated in the flow chart of FIG. 9. At step 236, scheduler and synchronizer 222 may receive a set of user-defined configuration variables (e.g., when downloadable user file 196 is transferred to scheduler and synchronizer 222 along bus 220).

At step 238, scheduler and synchronizer 222 may provide the user-defined configuration variables to temporary storage 224 and to resolution engines 226 for processing.

At step 240, resolution engines 226 may process the user-defined configuration variables to generate hardware-defined configuration variables based on pre-defined constraints that are implemented within the circuitry of resolution engines 226. For example, one of resolution engines 226 may receive a user-defined configuration variable X and may determine that hardware-defined configuration variable Y has a value that is dependent on the value of variable X. For example, the value of variable Y may always have a value "00000000" when variable X has a value "00000000" and variable Y may always have a value "00000001" when X has a value "11111111." The fact that variable Y always has a certain value depending on the value of variable X means that variable Y is dependent upon variable X. Variable X may therefore sometimes be referred to as an independent variable in this example.

At step 242, resolution engines 226 may provide the hardware-defined configuration variable values to temporary storage 224. Resolution engines 226 may configure CRAM 228 using the hardware-defined configuration variables and the user-defined configuration variables and any other pre-defined configuration data stored on temporary storage 224. CRAM 228 may then implement the desired user logic when loaded with the configuration variables (e.g., the user-defined, hardware-defined, and predefined configuration data bits may collectively form a complete and full configuration data bitstream that can be loaded onto CRAM 228 to implement the desired user logic).

Continuing the example described in connection with step 240 above, at step 242, resolution engine 226 may perform a series of arithmetic, comparison, and/or logical operations on variable X in order to generate a value for variable Y. Resolution engine 226 may then provide the generated value for variable Y to temporary storage 224 for storage. Once the values of all hardware-defined variables have been generated and stored in this manner, resolution engines 226 may generate a final configuration bitstream using the user-defined configuration variables and hardware-defined configuration variables stored in temporary storage 224, along with any predefined configuration data that may be stored in temporary storage 224.

Figure 10:
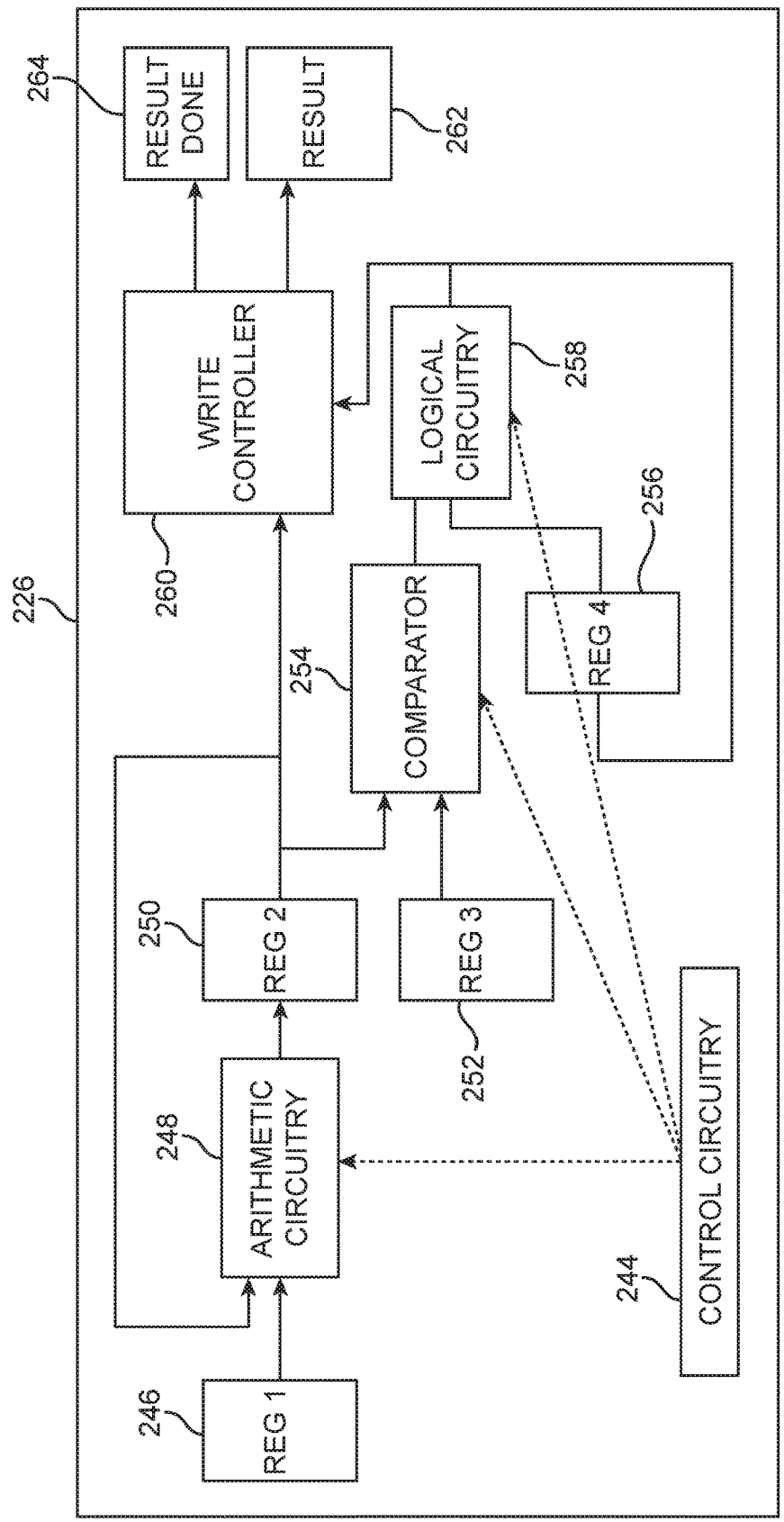
FIG. 10 is a diagram of an illustrative resolution engine of the type shown in FIG. 7 in accordance with an embodiment.

A detailed example of one of resolution engines 226 is shown in FIG. 10. As shown in FIG. 10, resolution engine 226 may include arithmetic circuitry 248, comparator 254, logic circuitry 258, write controller 260, registers 246, 250, 252, and 256, control circuitry 244, result storage 262, and result flag 264, for example. Arithmetic circuitry 248, comparator 254, and logical circuitry 258 may each receive control signals from control circuitry 244. In some embodiments, control circuitry 244 may be external to resolution engine 226, rather than internal to resolution engine 226 as shown in FIG. 10. Values stored in result storage 262 and registers 246, 250, 252, and 256 may be provided at an output of resolution engine 226 when configuration data is loaded onto CRAM 228.

Each hardware-defined configuration variable generated by resolution engines 226 may depend from one or more user-defined configuration variables and/or from one or more other hardware-defined configuration variables. The dependencies between different configuration variables may be may be expressed as organizational trees, which may be referred to herein as configuration variable dependency trees. Each configuration variable dependency tree for programmable logic device 100 may be independent from each other configuration variable dependency tree in device 100. Each of resolution engines 226 may include a different circuit layout that may be specific to a particular configuration variable dependency tree (e.g., so that multiple independent configuration variable dependency trees may be processed simultaneously in parallel).

Figure 11:
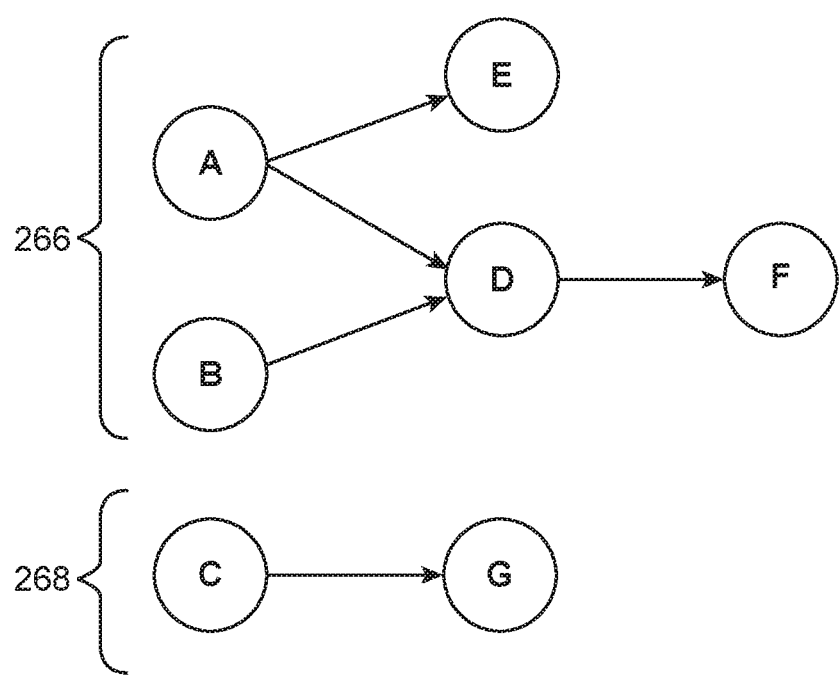
FIG. 11 is a diagram of an illustrative set of variables and corresponding variable dependencies that may be defined by hardware in an illustrative resolution engine of the type shown in FIG. 7 in accordance with an embodiment.

An example of two different independent configuration variable dependency trees is shown in FIG. 11. Configuration variables A, B, and C may be user-defined, whereas configuration variables D, E, F, and G may be hardware-defined based on predefined constraints implemented in the circuitry of resolution engines 226 in combination with the values of user-defined configuration variables A, B, and C.

In dependency tree 266, the value of configuration variable E may depend only on the value of configuration variable A. The value of configuration variable D may depend on both the value of configuration variable A and the value of configuration variable B. The value of configuration variable F may depend directly on the value of configuration variable D, and therefore may depend indirectly on the values of configuration variables A and B. In dependency tree 268, the value of configuration variable G may depend only on the value of configuration variable C.

Because dependency trees 266 and 268 are independent from one another, both dependency trees may be processed simultaneously in two respective parallel resolution engines 226. This is possible because the hardware constraints and user-defined configuration variables needed to generate values for configuration variables E, D, and F, are separate from the hardware constraints and user-defined configuration variable needed to generate a value for configuration variable G.

By processing independent dependency trees in parallel, the final configuration bitstream may be generated and loaded more quickly than if these operations were performed sequentially. Speeding up configuration bitstream generation and loading is desirable because it minimizes the time the programmable integrated circuit (e.g., system 138 of FIG. 5) spends idle.

An example of how resolution engine 226 of FIG. 10 could process dependency tree 268 of FIG. 11 is provided below. In the present example, the hardware-defined constraints for hardware-defined configuration variable G based on user-defined configuration variable C are as follows:

if C==C1
   G=G2
else
   G=G1

C1 may represent one possible value of user-defined configuration variable C. When user-defined variable C is at value C1, then hardware-defined variable G will be set to value G2. When user-defined variable C is any value other than value C1, then hardware-defined variable G will be set to value G1. Just as the dependency of the value of variable G on variable C is determined by the constraint provided above, the dependency of all hardware-defined configuration variables is determined by the predefined constraints implemented (hardcoded) into the hardware of resolution engines 226.

In the present example, the constraints defined above are implemented in resolution engine 226 of FIG. 10 (e.g., the circuitry of engine 226 may be arranged in such a way as to process the user-defined configuration variables input to the resolution engine using the predefined constraints so that the proper hardware-defined configuration variables are generated). When resolution engine 226 receives user-defined configuration variable C, variable C is written to register 246. As the present constraints require no arithmetic operation to be performed by arithmetic circuitry 248, configuration variable C is be copied and stored at register 250. Register 252 is written with value C1. Comparator 254 then compares the value of configuration variable C with value C1 and provides a true or a false output to logical circuitry 258. Logical circuitry 258 then processes and provides a true or false output indicating whether C==C1 (e.g., whether the value of configuration variable C is equal to value C1). In parallel with the operation of logical circuitry 258, register 2 is overwritten with value G2.

If the output of logical circuitry 258 is true, then write controller 260 writes G2 to result storage 262 and asserts result done flag 264. If instead the output of logic circuitry 258 is false, then write controller 260 does not assert result done flag 264. Result done flag 264 will instead be asserted in later operations after G1 is written to result storage 262. If result done flag 264 is asserted, then a value for configuration variable G has been found, otherwise other tests may be performed to find the value of configuration variable G is found.

In more complex cases, arithmetic operations may be performed prior to the operation of comparator 254 using arithmetic circuitry 248, and logical operations may be accumulated in order to generate a result of a complex logical condition with multiple terms. The example of FIGS. 10 and 11 are merely illustrative. In general, any desired dependency trees may be implemented using any desired logic circuitry.

Because each of resolution engines 226 may correspond to a specific configuration variable dependency tree as described above, multiple configuration variable dependency trees may be processed simultaneously in parallel. Compared to sequential processing, this method of parallel processing allows for a more expedient generation of hardware-defined configuration variables, and for a faster generation of the final configuration data stream to be loaded onto CRAM 228.

The foregoing is merely illustrative of the principles of this invention and various modifications can be made by those skilled in the art without departing from the scope and spirit of the invention. The foregoing embodiments may be implemented individually or in any combination.

What is claimed is:

1. A programmable logic device comprising:
   programmable logic circuitry;
   scheduling circuitry that receives user-defined configuration data; and
   a plurality of resolution engines coupled to the scheduling circuitry, wherein the plurality of resolution engines receives the user-defined configuration data from the scheduling circuitry, generates hardware-defined configuration data based on the user-defined configuration data and a set of pre-determined constraints, and loads the hardware-defined configuration data and the user-defined configuration data onto the programmable logic circuitry to implement a logic design for the programmable logic device, wherein the plurality of resolution engines generate a configuration data bitstream that includes the user-defined configuration data and the hardware-defined configuration data, and wherein the plurality of resolution engines loads the configuration data bitstream onto the programmable logic circuitry.

2. The programmable logic device defined in claim 1, further comprising:
   storage circuitry coupled to the scheduling circuitry and the plurality of resolution engines, wherein the storage circuitry receives the user-defined configuration data from the scheduling circuitry and the hardware-defined configuration data from the plurality of resolution engines, and wherein the storage circuitry stores the user-defined configuration data and the hardware-defined configuration data.

3. The programmable logic device defined in claim 2, further comprising:
a communications bus coupled between the scheduling circuitry, the storage circuitry, and the plurality of resolution engines, wherein the plurality of resolution engines are coupled in parallel between the communications bus and the programmable logic circuitry.

4. The programmable logic device defined in claim 1, wherein a given resolution engine of the plurality of resolution engines comprises:
a plurality of registers;
arithmetic circuitry that performs arithmetic operations on outputs of a first subset of the plurality of registers;
a comparator that performs comparator operations on outputs of a second subset of the plurality of registers;
logic circuitry that performs logic operations on outputs of the comparator and a third subset of the plurality of registers; and
a write controller that writes a value stored in one of the plurality of registers to a result storage circuit.

5. The programmable logic device of claim 4, wherein the write controller asserts a results done flag when the value is written to the result storage circuit.

6. The programmable logic device defined in claim 1, wherein the programmable logic circuitry comprises a plurality of configuration random access memory (CRAM) cells that are loaded with the user-defined configuration data and the hardware-defined configuration data to implement the logic design, and wherein the plurality of resolution engines are hardcoded into the programmable logic device.

7. The programmable logic device defined in claim 1, wherein the user-defined configuration data is the minimum amount of configuration data needed to generate the hardware-defined configuration data, and wherein the hardware-defined configuration data is generated based on predefined hardware constraints implemented in the hardware of the plurality of resolution engines and based on hardware constraints that specify dependencies of particular hardware-defined configuration variables on the user-defined configuration data.

8. A method of configuring programmable logic circuitry on an integrated circuit to implement a logic design on the integrated circuit, the method comprising:
with scheduling circuitry on the integrated circuit, receiving user-defined configuration data from an external device;
with a plurality of resolution engines on the integrated circuit, receiving the user-defined configuration data from the scheduling circuitry and generating hardware-defined configuration data based on the user-defined configuration data and a set of pre-defined constraints;
with the plurality of resolution engines, generating a configuration data bitstream based on the user-defined configuration data and the hardware-defined configuration data; and
with the plurality of resolution engines, loading the configuration data bitstream onto configuration random access memory on the integrated circuit to configure the configuration random access memory to implement the logic design.

9. The method defined in claim 8, further comprising:
with storage circuitry on the integrated circuit, receiving the user-defined configuration data from the scheduling circuitry; and
with the storage circuitry, receiving and storing the hardware-defined configuration data from the plurality of resolution engines.

10. The method defined in claim 9, wherein generating the hardware-defined configuration data based on the user-defined configuration data and a set of pre-defined constraints comprises:
with the plurality of resolution engines on the integrated circuit, processing subsets of the user-defined configuration data simultaneously and in parallel based on the set of pre-defined constraints to generate the hardware-defined configuration data.

11. The method defined in claim 10, wherein processing subsets of the user-defined configuration data simultaneously and in parallel based on the set of pre-defined constraints to generate the hardware-defined configuration data comprises:
with a first resolution engine of the plurality of resolution engines, generating a first set of hardware-defined configuration variables from a first set of user-defined configuration variables based on a first dependency tree that relates the first set of hardware-defined configuration variables to the first set of user-defined configuration variables; and
with a second resolution engine of the plurality of resolution engines, generating a second set of hardware-defined configuration variables from a second set of user-defined configuration variables based on a second dependency tree that relates the second set of hardware-defined configuration variables to the second set of user-defined configuration variables, wherein the first dependency tree is independent of the second dependency tree.

12. The method defined in claim 8, wherein the user-defined configuration data is the minimum amount of configuration data needed to generate the hardware-defined configuration data, and wherein the hardware-defined configuration data is generated based on predefined hardware constraints implemented in the hardware of the plurality of resolution engines.

13. An integrated circuit comprising:
scheduling circuitry that receives configuration data;
a storage device that is coupled to the scheduling circuitry, that receives the configuration data from the scheduling circuitry, and that stores the configuration data received from the scheduling circuitry;
at least one resolution engine that generates additional configuration data based on the configuration data and a set of pre-defined constraints, wherein the at least one resolution engine generates a bitstream comprising the configuration data and the additional configuration data; and
configuration random access memory coupled to the at least one resolution engine that receives the bitstream from the at least one resolution engine to implement a logic design.

14. The integrated circuit defined in claim 13, wherein the storage device stores preloaded configuration data that is different from the configuration data and the additional configuration data, and wherein the bitstream generated by the at least one resolution engine further comprises the preloaded configuration data.

15. The integrated circuit defined in claim 13, wherein the at least one resolution engine comprises multiple resolution engines arranged in parallel.

16. The integrated circuit defined in claim 13, wherein the scheduling circuitry receives the configuration data from a circuit design system.

17. The integrated circuit defined in claim 13, wherein the configuration data comprises a user-defined configuration variable, wherein the additional configuration data comprises a hardware-defined configuration variable, and wherein a value of the hardware-defined configuration variable is dependent upon a value of the user-defined configuration variable.

18. The integrated circuit defined in claim 13, wherein the user-defined configuration data is the minimum amount of configuration data needed to generate the hardware-defined configuration data.

* * * * *